US010911180B2

(12) United States Patent
Gaderer et al.

(10) Patent No.: US 10,911,180 B2
(45) Date of Patent: Feb. 2, 2021

(54) NETWORK DEVICE AND METHOD FOR SCALABLE DATA INTEGRITY CHECKING

(71) Applicant: TTTech Computertechnik AG, Vienna (AT)

(72) Inventors: Georg Gaderer, Vienna (AT); Günther Bauer, Vienna (AT)

(73) Assignee: TTTECH COMPUTERTECHNIK AG, Vienna (AT)

( * ) Notice: Subject to any disclaimer, the term of this patent is extended or adjusted under 35 U.S.C. 154(b) by 7 days.

(21) Appl. No.: 16/387,772

(22) Filed: Apr. 18, 2019

(65) Prior Publication Data
US 2019/0327025 A1 Oct. 24, 2019

(30) Foreign Application Priority Data
Apr. 23, 2018 (EP) .................................... 18168798

(51) Int. Cl.
H04L 12/939 (2013.01)
H04L 1/00 (2006.01)
(52) U.S. Cl.
CPC .......... H04L 1/0061 (2013.01); H04L 1/0041 (2013.01)
(58) Field of Classification Search
CPC ... H04L 1/0061; H04L 1/0041; H04L 49/555; H04L 49/30; H04L 49/10; H04L 49/15;
(Continued)

(56) References Cited
U.S. PATENT DOCUMENTS 6,263,445 B1 * 7/2001 Blumenau ............... G06F 21/31
726/2
2008/0239973 A1 10/2008 Cabaret et al.
(Continued)

FOREIGN PATENT DOCUMENTS
EP 2629459 A2 8/2013

OTHER PUBLICATIONS
European Search Report, for EP Application No. 18168798.9, dated Jul. 17, 2018 (12 pages).

Primary Examiner — Samir W Rizk
Assistant Examiner — Enam Ahmed
(74) Attorney, Agent, or Firm — Eversheds Sutherland (US) LLP

(57) ABSTRACT

A method for data integrity check in a network device of a computer network. The network device includes a communication module and a monitoring module. The monitoring module receives (a) the same data being received by a communication module from an input port of the network device, and (b) the same data the communication module transmits towards output port/s of the network device. The monitoring module (i) derives, after receiving the same R-data as the communication module, a sub-tuple of the R-data, a "R-data sub-tuple", wherein the R-data sub-tuple includes m of the n data elements of the n-tuple of R-data, wherein m>0 and m<n, (ii) stores, after deriving the R-data sub-tuple, only the R-data sub-tuple, (iii) derives, after receiving the T-data corresponding to the R-data, a sub-tuple of the T-data, a "T-data sub-tuple", and (iv) compares the stored R-data sub-tuple with the T-data sub-tuple, and (v) executes at least one specified/specifiable action, if the comparison determines the R-data sub-tuple and T-data sub-tuple are not identical.

21 Claims, 3 Drawing Sheets

(58) Field of Classification Search
CPC ... H04L 49/252; H04L 49/352; H04L 43/065; H04L 41/24; H04L 63/123; H04L 49/552; H04L 1/0007; H04L 1/0083; H04L 2212/00
USPC .......................................................... 714/807
See application file for complete search history.

(56) References Cited

U.S. PATENT DOCUMENTS

| | | | |
|---|---|---|---|
| 2013/0031037 A1* | 1/2013 | Brandt | H04L 63/1416 706/12 |
| 2013/0111308 A1* | 5/2013 | Sauber | G06F 11/1004 714/807 |
| 2013/0166960 A1 | 6/2013 | Das et al. | |
| 2019/0347231 A1* | 11/2019 | Johnson | G05B 19/418 |
| 2019/0363959 A1* | 11/2019 | Rice | G06F 16/221 |

\* cited by examiner

NETWORK DEVICE AND METHOD FOR SCALABLE DATA INTEGRITY CHECKING

CROSS-REFERENCE TO RELATED APPLICATIONS

This application claims priority to European Patent Application No. 18168798.9, filed Apr. 23, 2018, which is incorporated herein by reference.

TECHNICAL FIELD

The invention relates to a network device for a computer network and to a method for data integrity check in a network device of a computer network.

BACKGROUND

A communication module, also referred to as COM module, is a core module in a network device. The COM module is responsible for receiving, handling and transmitting data. In a network device in form of a network star coupler (typically known as network switch for Ethernet networks), the COM module is responsible for forwarding data (e.g., Ethernet frames) from ingress to egress ports according to a specified or a specifiable scheme and according to a specified or a specifiable time schedule. The COM module, however, typically should not modify the data (for Ethernet based networks, for example, the data corresponds to the Ethernet frame). In particular, it should be assured that the COM module does not alter the data unwillingly, and if this happens, that the corrupted data is not forwarded.

In computer networks, in particular, in safety-related computer networks, monitoring and assuring data integrity is highly important. Assuring that the data has not been altered during its transfer on communication channels, and thus the data integrity is kept, is done by adding different kinds of error-detecting codes to the transmitted data. In Ethernet, for example, a frame check sequence (FCS) is added to the Ethernet frame.

However, network devices can also wrongly and unintentionally modify the data, e.g., due to a hardware or software fault or, e.g., due the influence of electromagnetic radiation.

To assure that the data has not been wrongly and unintentionally modified in a network device itself, network devices are known in the state-of-the-art which comprise an additional monitoring module, also referred to as MON module, which monitors the data handling COM module.

In such network devices, the COM and the MON module receive the same data ("receiving data", "R-data") and, in addition, the MON module receives also the data being transmitted from the COM module ("transmission data", "T-data"). To assure that the data has not been unintentionally modified by the COM module, the MON module compares said receiving data with said transmission data. If the receiving data and the transmission data do not match, this means that the COM module (unintentionally and wrongly) has modified the data and that the COM module might be faulty.

To ensure that the MON module compares transmission data (T-data) to the corresponding receiving data (R-data), preferably data are uniquely identified with a data identification field or with data identification fields. In an Ethernet network, especially in a TTEthernet network, data is encapsulated into Ethernet frames, wherein said Ethernet Frame can be identified by some combination of bits from a Frame Header and/or payload of the Ethernet frame, for example, using Virtual Link ID (VLID), FCS and a Sequence Number.

Since receiving, handling and transmitting of the data by the COM module requires time, the MON module preferably stores said receiving data in its memory for a time being sufficient to compare the (stored) receiving data to the transmission data (T-data). If the MON module stores the entire data (e.g., in the case of Ethernet devices, complete Ethernet frames), it needs a considerably high amount of memory, which makes such network devices expensive.

It therefore would be desirable to provide a method and network device providing data integrity checking with higher flexibility regarding the data to be checked, and with smaller memory consumption in the network device compared to solutions known from the state-of-the-art.

SUMMARY

A network device for a computer network and a method for data integrity check in a network device of a computer network are provided, wherein said network device comprises (i) a communication module, wherein said communication module is connected to one or more input ports of the network device, and wherein said communication module is connected to one or more output ports of the network device, and wherein the communication module is configured for receiving data from input ports of the network device, handling said data and transmitting said data towards one or more output ports of the network device, and (ii) a monitoring module, wherein said monitoring module is configured for receiving the same data, which are being received by a communication module from an input port of the network device, and/or wherein the network device is configured in a way that a monitoring module receives the same data, which are being received by a communication module from an input port of the network device, and wherein said communication module and said monitoring module are interconnected, in particular over at least one data communication link, so that the monitoring module receives the same data which the communication module transmits towards one or more output ports, and wherein in case the communication module receives so-called R-data, wherein R-data comprise n data elements, wherein said n data elements are forming an n-tuple, and wherein said R-data are data which the communication module receives from one input port, and wherein said data in its entirety, that is all n data elements of the R-data, are designated to be transmitted by the communication module towards one selected output port or towards more selected output ports, the monitoring module receives the same R-data, and wherein the communication module transmits so-called T-data, wherein T-data are data based on the data elements of the R-data received by the communication module, towards the output port or towards more output ports of the network device, for which output port or ports the R-data corresponding to the T-data are designated, and wherein the monitoring module receives said T-data. The monitoring module (i) derives, after receiving the same R-data as the communication module, a sub-tuple of the R-data, a "R-data sub-tuple", wherein the R-data sub-tuple includes m of the n data elements of the n-tuple of R-data, wherein m>0 and m<n, (ii) stores, after deriving the R-data sub-tuple, only the R-data sub-tuple, (iii) derives, after receiving the T-data corresponding to the R-data, a sub-tuple of the T-data, a "T-data sub-tuple", and (iv) compares the stored R-data sub-tuple with the T-data sub-tuple, and (v) executes at least one specified/specifiable action, if the comparison determines the R-data sub-tuple and T-data sub-tuple are not identical.

BRIEF DESCRIPTION OF THE DRAWINGS

In the following, in order to further demonstrate the present invention, illustrative and non-restrictive embodiments of the invention are discussed, as shown in the drawings, which show.

DETAILED DESCRIPTION

Figure 1:
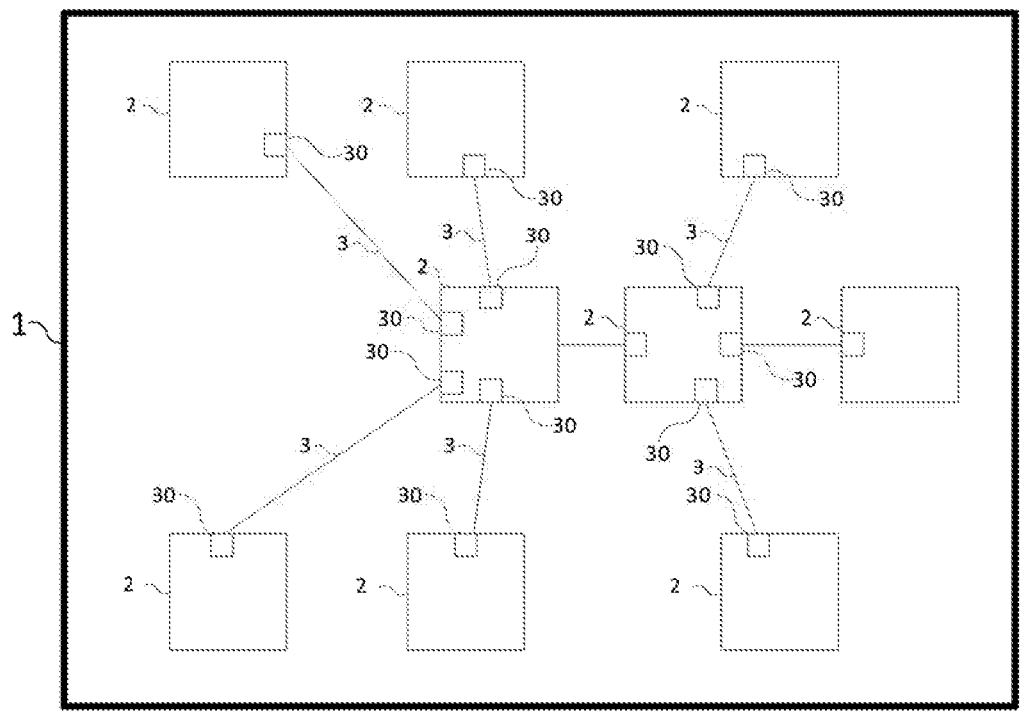
FIG. 1 a computer network which may comprise one or more network devices according to the invention, FIG. 2 a schematic overview of a network device according to the invention, FIG. 3 a more detailed overview of network device according to the invention, and FIG. 4 an example of a method according to the invention executed in a network device as depicted in FIG. 2.

An object of the invention is to provide methods and network devices providing data integrity checking with higher flexibility regarding the data to be checked, and with smaller memory consumption in the network device compared to solutions known from the state-of-the-art.

This object is achieved with a network device mentioned in the Background above, wherein according to the invention the monitoring module is further configured for deriving, after receiving the same R-data as the communication module, a sub-tuple of said R-data, a so-called "R-data sub-tuple", wherein said R-data sub-tuple comprises m of the n data elements of the n-tuple of R-data, wherein m>0 and m<n, for storing, after deriving said R-data sub-tuple, only said R-data sub-tuple, for deriving, after receiving the T-data corresponding to said R-data, a sub-tuple of said T-data, a so-called "T-data sub-tuple", and for comparing said stored R-data sub-tuple with said T-data sub-tuple, and to execute at least one specified or specifiable action, if the comparison of said stored R-data sub-tuple with said T-data sub-tuple delivers as result that said R-data sub-tuple and said T-data sub-tuple are not identical.

Furthermore, this object is achieved with a method mentioned above, wherein according to the invention the monitoring module derives, after receiving the same R-data as the communication module, a sub-tuple of said R-data, a so-called "R-data sub-tuple", wherein said R-data sub-tuple comprises m of the n data elements of the n-tuple of R-data, wherein m>0 and m<n, stores, after deriving said R-data sub-tuple, only said R-data sub-tuple, derives, after receiving the T-data corresponding to said R-data, a sub-tuple of said T-data, a so-called "T-data sub-tuple", and compares said stored R-data sub-tuple with said T-data sub-tuple, and executes at least one specified or specifiable action, if the comparison of said stored R-data sub-tuple with said T-data sub-tuple delivers as result that said R-data sub-tuple and said T-data sub-tuple are not identical.

A tuple is a finite ordered list (sequence) of elements. An n-tuple is a sequence (https://en.wikipedia.org/wiki/Sequence) (or ordered list) of n elements, where n is a non-negative integer (https://en.wikipedia.org/wiki/Integer). In the present case, in addition, n>1. The elements of a tuple are ordered, so that, for example, tuple (1,2,3)≠tuple (3,2,1), whereas a set {1,2,3}=set {3,2,1}.

"T-data based on R-data" means that—in case of no fault—the T-data consist of all R-data, ordered in the same sequence as the R-data, and said T-data are transmitted to one or more outputs of the network device, for which the R-data (or the data elements forming said R-data) are designated for. In case of a fault one or more data elements of the R-data are missing in the T-data and/or one or more data elements have been changed. In case of no fault the data elements of the T-data sub-tuple are ordered in the same sequence as the (corresponding) data elements in the R-data sub-tuple.

The wording "part1 (for example, a communication module) being connected to part2 (in this example a port)" may express that part1 and part2 are directly connected; however, this wording also covers the meaning that one or more components are arranged between part1 and part2.

The wording "wherein said data in its entirety are designated to be transmitted by the communication module towards one selected output port or towards more selected output ports" means the following: in case the data are designated for only one output port, the situation is clear—all data are transmitted to this one output port. In case the data are designated to be transmitted to more output ports, for example to a port no. 1, to a port no. 2, and to a port no. 3, then all data (in their entity) are transmitted to port no. 1, all data are transmitted to port no. 2, and all data are transmitted to port no. 3.

R-data comprise a number n of data elements, preferably with said number n being greater than 1.

Furthermore, the invention relates to a a computer network comprising a plurality of network devices and a plurality of communication channels, wherein each communication channel connects at least two network devices to allow communication between connected network devices including an exchange of messages according to a network protocol, characterized in that at least one, preferably a plurality of network devices of the computer network, is/are a network device as described above.

According to the invention, the MON module is configured to store, after receiving, only a R-data sub-tuple of (R-)data to be checked for integrity, so that an optimal trade-off between the memory size of the MON module and the level of data integrity checking can be achieved. Reducing the memory size of the MON module reduces its costs and thus costs of the network device itself.

Commercially the present invention allows to develop network devices, for example for aerospace systems, with a much higher flexibility regarding the trade-off between costs and level of data integrity checking compared to network devices actually available on the market.

The wording "store, after receiving" means that the COM module contains means, for example a dedicated memory, to retain said R-data sub-tuple of receiving data (R-data) until the sub-tuple of transmission data (T-data) is received and ready for comparison. This wording does not include short-time "buffering" of data which some devices can perform while receiving data.

Furthermore, this object is achieved with a computer network comprising a plurality of network devices and a plurality of communication channels, wherein each communication channel connects at least two network devices to allow communication between connected network devices including an exchange of messages according to a network protocol (e.g., Ethernet, TTEthernet, AFDX, Time Triggered Protocol), wherein one or more network devices is/are constructed as a network device as described above.

Advantageous embodiments of the network device, computer network and method, are detailed hereinafter:

The communication module may be connected to each of the input ports with at least one connection link and to each of the output ports with at least one connection link, respectively, wherein preferably the connections links are bi-directional connection links.

As mentioned above, the connection may be a direct connection or one or more other components may be arranged along the connection link.

For each input port at least one connection link, in particular exactly one connection link, may be provided, which at least one connection link per input port is connected to the monitoring module, and wherein said at least one connection link is further connected to said input port, or wherein the at least one, in particular one, connection link is additionally connected to the connection link which is connecting said input port with the communication module.

The monitoring module may apply, for deriving the R-data sub-tuple, the same rule or scheme as for deriving the T-data sub-tuple of the T-data corresponding to said R-data. For example, deriving the R-data sub-tuple may happen by "taking" a number (≥1) of data elements of said R-data. The rule or scheme as mentioned above will determine which data elements to take from the R-data; for example, the rule/scheme may determine to take the first, second and fifth data element of the R-data, which three data elements form the R-data sub-tuple. Accordingly, the same rule/scheme has to be applied when deriving the sub-tuple of the corresponding T-data. In the example described, the first, second and fifth data element are taken from the T-data to form the corresponding T-data sub-tuple, so that a reasonable comparison of the R-data sub-tuple and the corresponding T-data sub-tuple may be executed.

The at least one specified or specifiable action is one or more of the following actions:

reporting an error, preferably to an error-handling module, especially an error-handling hardware or software module;

controlling, for example over a control interface, an on-off data switch or more on-off data switches, which at least one on-off data switch is capable of stopping data to be forwarded to an output port of the network device, wherein for example the at least one on-off data switch is arranged between the communication module and the one our more output ports of the network device, and stopping said on-off data switch from forwarding said T-data of the communication module to the at least one output port of the network device or to bring the at least one on-off data switch into a state in which said T-data cannot pass the at least one on-off data switch.

The error-handling module may be arranged in the network device, but may also be located outside of the network device, for example in the network.

Data may be received and transmitted according to the Ethernet protocol, and wherein the data elements being comprised in said data are encapsulated into Ethernet frames, and wherein the monitoring module is configured to compare an R-data sub-tuple of R-data being encapsulated into an or at least one Ethernet frame with the corresponding T-data sub-tuple of the corresponding T-data being encapsulated into an or at least one Ethernet frame.

An R-data sub-tuple and/or a T-data sub-tuple may be one or a combination of the following items:
the Ethernet header of an Ethernet frame or a part or parts of an Ethernet header of an Ethernet frame;
the sequence number of an Ethernet frame;
the payload or parts of the payload of an Ethernet frame;
the frame check sequence, FCS, of an Ethernet frame;
and wherein the following combination representing a complete Ethernet frame, that is an Ethernet frame including a FCS, is excluded: the Ethernet header, and the sequence number of said Ethernet frame, and the payload, and the frame check sequence FCS of said Ethernet frame,
or wherein the following combination representing an Ethernet frame which is a complete Ethernet frame without FCS is excluded: the Ethernet header, and the sequence number of said Ethernet frame, and the payload.

The at least one communication module and the at least one monitoring module each may be implemented in hardware or in software.

The at least one communication module and the at least one monitoring module may be implemented in different chips, or in the same chip.

The at least one monitoring module may additionally be configured to calculate and to store a first checksum, a so-called R-data checksum, which R-data checksum is calculated
of the R-data received, or
of the R-data sub-tuple, or
of a second sub-tuple of the R-data received, and to calculate a second checksum, a so-called T-data checksum,
of the T-data subset corresponding to said R-data, or
of the T-data sub-tuple of the T-data corresponding to said R-data, or
of a second T-data sub-tuple corresponding to said R-data, wherein preferably for deriving said second R-data sub-tuple and said second T-data sub-tuple from the R-data and the corresponding T-data, respectively, the same rule or scheme is applied,
and to compare said R-data checksum with said T-data checksum, and wherein the monitoring module is configured to execute at least one specified or specifiable action, if the comparison of said R-data checksum with said T-data checksum yields that the checksums are not identical, and wherein said at least one specified or specifiable action is one or more of the following actions:
reporting an error, preferably to an error-handling module, especially an error-handling hardware or software module;
controlling the on-off data switch and stopping said on-off data switch from forwarding the T-data of said communication module to an output of the network device.

One or more data elements of R-data may represent a frame check sequence, the so-called R-data FCS, and wherein the at least one monitoring module is configured to calculate a frame check sequence, the so-called monitoring FCS, of data elements being contained in the T-data corresponding to said R-data, and to compare the calculated R-data FCS with said monitoring FCS, and wherein the monitoring module is configured to execute at least one specified or specifiable action, if the comparison of said monitoring FCS with said R-data FCS yields checksums, which are not identical, and wherein said at least one specified or specifiable action is one or more of the following actions:

reporting an error, preferably to an error-handling module, especially an error-handling hardware or software module;

controlling the on-off data switch and stopping said on-off data switch from forwarding said transmission data of said communication module to an output of the network device.

R-data contain data elements, in particular n data elements. One or more data elements of said n data elements, for example b data elements (with 0<b<n) specify the FCS as described above, wherein this FCS is derived, typically calculated, for example by a sender of the R-data, from the (n−b) data elements of the R-data, which "remaining" data elements do not specify the FCS (in other words, there is a number n−b of data elements, from which data elements the FCS is calculated, e.g. by a sender, and a data elements of the (R-)data specify/describe said R-data FCS). Accordingly, the T-data FCS is calculated by the monitoring module based on all data elements of the T-data which do not represent/specify a (possibly already in the T-data contained) FCS. In case the T-data do not contain a FCS, all data elements of the T-data are used for calculating the T-data FCS.

The at least one communication module may execute data transmission according to a specified and/or specifiable communication schedule, in particular a time-triggered communication schedule, and wherein the at least one monitoring module has knowledge of said communication schedule, and wherein the at least one monitoring module checks if T-data of the at least one communication module occur corresponding to said communication schedule, and wherein the at least one monitoring module is configured to execute at least one specified or specifiable action, if T-data of the at least one communication module do not occur corresponding to said communication schedule, and wherein said at least one specified or specifiable action is one or more of the following actions:

reporting an error, preferably to an error-handling module, especially an error-handling hardware or software module;

controlling the on-off data switch and stopping said on-off data switch from forwarding said T-data of the at least one communication module to an output of the network device.

The network device may be an Ethernet switch, and/or the communication between the at least one communication module and the at least one monitoring module may take place over a Media-independent interface MII or over a Gigabit media-independent interface GMII.

FIG. 1 depicts a computer network 1 comprising a plurality of network devices 2 and a plurality of communication channels 3, wherein each communication channel 3 directly connects two network devices 2 to allow communication between the network devices 2 of the computer network. Preferably, each network device 2 comprises one or more ports 30, wherein at least one communication channel 3 is connected to a port 30. In particular, exactly one communication channel 3 may be connected to exactly one port 30.

The communication mentioned includes an exchange of messages between network devices according to a network protocol e.g., Ethernet, TTEthernet, AFDX, Time Triggered Protocol, wherein said messages contain data.

A computer network 1 according to the invention comprises one or more network devices 2 which are configured and/or construed as network device according to the invention. A network device according to the invention may be connected to one or more other network devices according to the invention, to one or more network devices according to the state-of-the art, or to one or more network devices according to the invention and one or more network devices according to the state-of-the art. Examples of a network device according to the invention will be described in more detail in the following.

Figure 2:
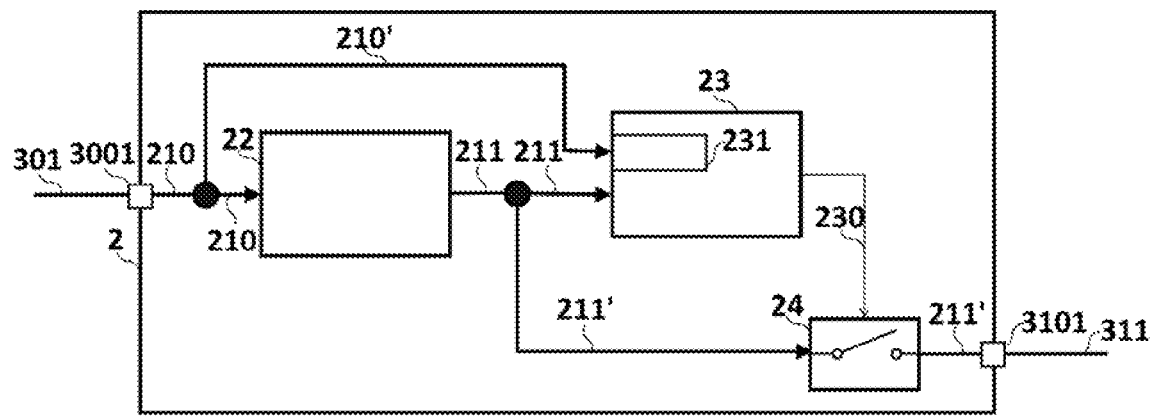

FIG. 2 shows a schematic overview of a network device 2 according to the invention. Data from another network device or from the network in general are arriving at or being transmitted to said network device 2 and arrive on an input port 3001 of the network device 2 via a link 301. The network device 2 comprises at least one communication module, "COM module", in particular one COM module 22, wherein said COM module 22 is configured for receiving said data. In the following the data being received by the COM module are denoted as "receiving data", abbreviated as "R-data". The network device 2 comprises, for example, one or more incoming connection links 210, on which the at least one COM module 22 receives said R-data from a port 3001.

Additionally, the COM module 22 is configured for handling data, in particular said R-data, wherein said handling may include, e.g., buffering said data in data queues, performing error detection by checking a CRC of said data, and transmitting data as "transmission data", abbreviated as T-data, for example on one or more outgoing connection links 211, 211', according to a specifiable or specified scheme and/or according to a specifiable or specified time schedule. The COM module 22 is configured to not consume and/or to not change data, in particular said R-data.

Connection links in the network device 2 may be realized using, e.g., an Media-independent interface MII or a Gigabit media-independent interface GMII.

Furthermore, the network device 2 comprises at least one monitoring module, "MON module", in particular one MON module 23, wherein the network device 2 is configured/construed such that the MON module 23 receives, in the case that the COM module 22 receives data (R-data), the same/identical data, i.e. data identical to the R-data received by the COM module 22. For example, the MON module 23 receives said data, which are identical to R-data received by the COM module 22, via a connection link 210'. For example, the MON module may be connected "directly" to port, wherein directly means that an own connection link is provided which is connecting the MON module to the port, or, as depicted in FIG. 2, the connection link 210 connecting the COM module 22 and the port 3001 has a branch 210', which branch forms the connection link 210' connecting the MON module 23 to the port 3001.

Additionally, the network device is configured such that data transmitted by the COM module 22, the so-called the T-data, towards an output port 3101 of the network device 2, are also transmitted to the MON module 23, and the MON module 23 is configured to receive said T-data.

In a preferred embodiment as depicted in FIG. 2, for the purpose described above, the COM module 22 is connected to the MON module 23 with a connection link 211, wherein said connection link has a branch 211', which branch 211' forms a connection link 211' connecting the COM module 22 also with the output port 3101 of the network device 2.

The output port 3101 of the network device 2 is connected to the network with a link 311.

Furthermore, the MON module may comprise a data memory 231 to store data.

As mentioned, the COM module 22 receives data, for example on an incoming link 210, and forwards it, for example to an outgoing link 211, according to a forwarding scheme, without changing the data. Data is typically encapsulated in data frames (e.g., Ethernet frames), which data frames are uniquely identifiable. In Ethernet, frames are identifiable using some combination of bits from a Frame Header and/or payload of the Ethernet frame, for example, using Virtual Link ID (VLID), FCS and a Sequence Number.

Main function of the MON module 23 is to compare the R-data it has received with the T-data corresponding to said R-data, which T-data the MON module 23 has received from the COM module 22.

"Corresponding" in this context means for example that said T-data being forwarded by the COM module 22 (towards the output of the network device and to the MON module) have the same identification as R-Data received by the COM module 22, for example on an incoming link 210.

For the purpose of comparing the R-data with the corresponding T-data it is necessary, according to the state of the art, that the MON module stores all R-data it receives.

Now, according to the invention, the MON module 23 is configured in such a way that it only stores a part of the R-data it has received. In particular, the R-data form a dataset (a so-called "R-data dataset"), wherein such a dataset comprises a number of data elements, and the MON module 23 stores only a sub-tuple of said R-data dataset. We denote said sub-tuple of the R-data dataset as "R-data sub-tuple".

The T-data are forming a T-data dataset. The MON module 23 creates a sub-tuple of said T-data dataset, the so-called "T-data sub-tuple", and compares the R-data sub-tuple with said T-data sub-tuple. In case that these sub-tuples of corresponding R- and T-data do not match, which means that the data integrity is not preserved (data is unwillingly altered), the MON module 23 will prevent the transmission of the corresponding T-data to the output port 3101 of the network device 2.

For generating an R-data sub-tuple based on R-data received by the MON module 23, the MON module 23 applies a specific rule. The same rule as applied for generating said R-data sub-tuple is also applied to generate a T-data sub-tuple based on the T-data corresponding to the before mentioned R-data.

For example: an R-data set consists of 20 bits (data elements) with a specific order as shown: {Rbit1, Rbit2, . . . , Rbit20}. The rule for generating a sub-tuple of a data set is to choose data elements bit1, bit3 and bit20 in the same order as they appear in the R-data. Applying this rule to said data set (=R-data) in the MON module 23 will yield the R-data sub-tuple (Rbit1, Rbit3, Rbit20). Furthermore, the MON module 23 will apply this rule to the corresponding T-data set {Tbit1, Tbit2, . . . , Tbit20} which it has received from the COM module. Applying the above rule yields the T-data sub-tuple (Tbit1, Tbit3, Tbit20). These data sub-tuples (Rbit1, Rbit3, Rbit20) and (Tbit1, Tbit3, Tbit20) are compared, whether the data elements on the specific positions are identical Rbit1=Tbit1, Rbit2=Tbit2, Rbit3=Tbit3, or not.

To prevent transmission of altered data, as described above, the network device 2 may comprise an on-off data switch 24, and the MON module 23 is configured to signal the on-off data switch 24, for example via the signalling link (control interface) 230, to drop the corresponding T-data (e.g., an Ethernet frame) and to not forward it.

For example, as depicted in FIG. 2, the on-off data switch 24 is arranged between the COM module 22 and the output port 3101 of the network device 2, in particular in the connection link 211', and the on-off data switch 24 may be switched between two states, wherein in one state the data transmitted from the COM module towards the output port 3101 can pass to the output port 3101, and wherein in the other state the transmission via the connection link 211' to the output port 3101 is interrupted.

Said on-off data switch 24 is, as described above, controlled by the MON module 23.

Figure 3:
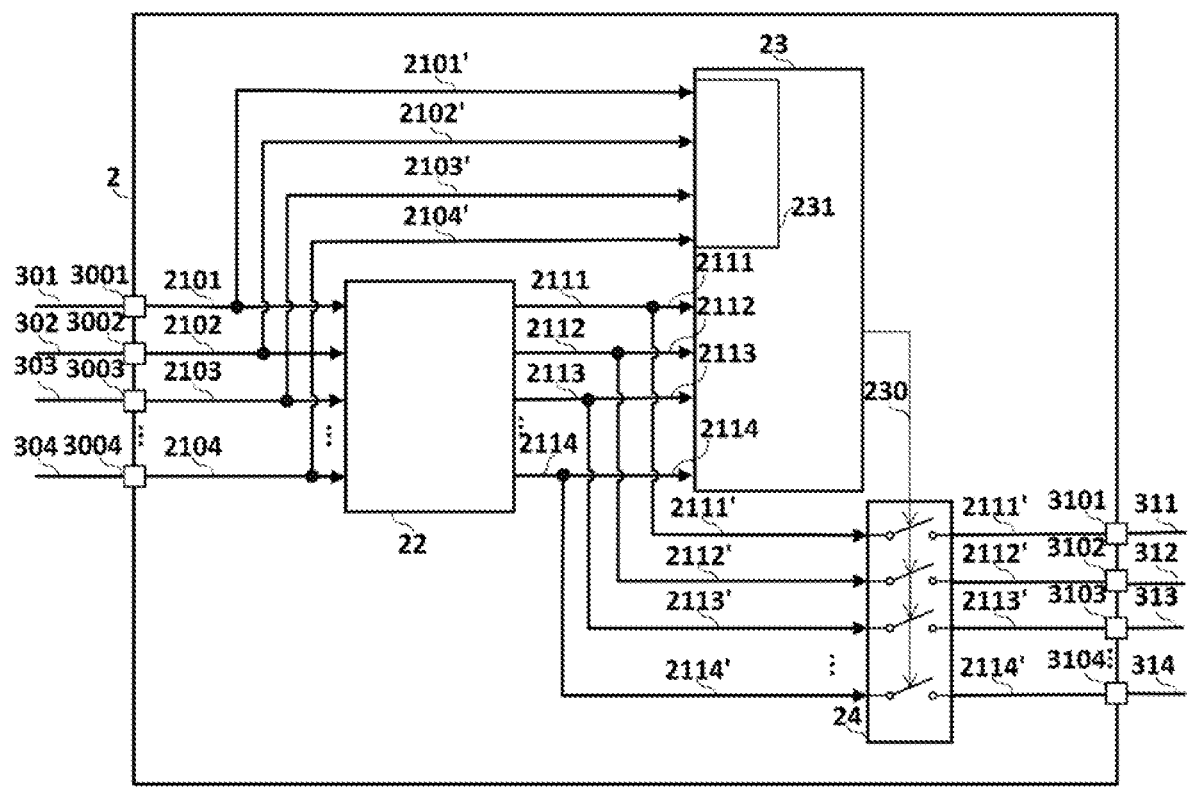

FIG. 3 depicts a network device 2 according to the invention in more detail and with more complexity. However, in principle the network device according to FIG. 3 works like the network device of FIG. 2, so that the explanations in connection with FIG. 2 are also valid for a network device according to FIG. 3. Accordingly, details which are in analogy to details as described in FIG. 2 are not detailed in connection with FIG. 3.

In particular, the COM module 23 according to a network device 2 shown in FIG. 3 is connected to input ports (in this example ports 3001, 3002, 3003, 3004) via input data connection links 2101, 2102, 2103, 2104, wherein each communication channel (link) 301, 302, 303, 304 of the computer network (compare with FIG. 1) is connected to one of said input ports 3001, 3002, 3003, 3004 of the network device 2.

Furthermore, the COM module 22 is connected to output ports 3101, 3102, 3103, 3104 via connection links 2111, 2111', 2112, 2112', 2113, 2113', 2114, 2114'. The output ports 3101, 3102, 3103, 3104 are connected to the network by communication channels (links) 311, 312, 313, 314.

Main function of the COM module 22 is to forward R-data which it receives from an input port in its entity towards one or more of the output ports 3101, 3102, 3103, 3104 according to a specified or a specifiable scheme and/or according to a specified or a specifiable time schedule.

The forwarded data is referred as T-data. Such a scheme is based on the source and destination addresses of the data. For example, it can be specified that the R-data incoming on the input port 3002 with a particular destination address has to be forwarded towards the output port 3101 and 3103.

The MON module 23 is also connected to said input ports 3001, 3002, 3003, 3004 via input data connection links 2101', 2102', 2103', 2104' (in analogy to the embodiment of FIG. 2) to receive the same data (R-data) which the COM module 22 receives via an input port.

Furthermore, the network device 2 comprises an on-off data switch 24 which is connected to the output of the COM module 22, in particular the on-off data switch 24 is arranged in the connection links 2111', 2112', 2113', 2114'.

Additionally, the MON module 23 is also connected to the output of the COM module 22 via data connection links 2111, 2112, 2113, 2114, so that the MON module 23 receives the same T-data from the COM module 22, which the COM module 22 transmits to the output ports of the network device 2.

The on-off data switch 24 receives control signals from the MON module 23 via a control link 230 to either forward the T-data via the data output connection links 2111', 2112', 2113', 2114' to the output ports for which said T-data are destined, or to drop or block said transmission data.

The above formulation "on-off data switch . . . to forward" does not necessarily mean that the on-off data switch is an active component. The switch 24 may be an active component, which in one state actively forwards data which it receives via a connection link, and in the other state actively drops or blocks said data. However, as described in connection with FIG. 2, the on off-data switch may also be passive in the way that in one state of the switch the connection to the output port(s) is continuous, so that data can be pass to the port(s), and in the other state the connection is interrupted, so that data cannot pass the switch an cannot reach the port(s).

Figure 4:
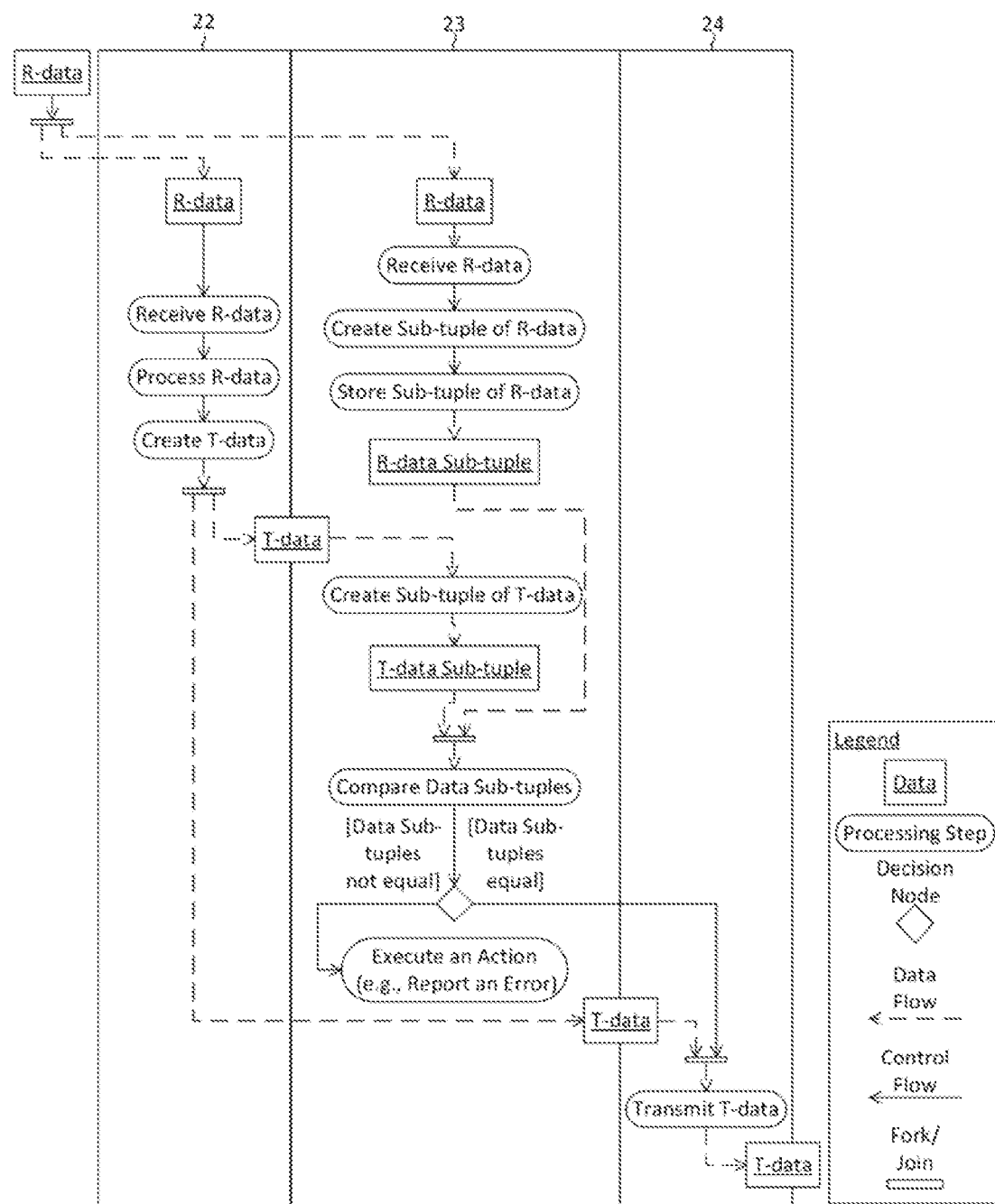

FIG. 4 shows the show the method according to the invention in a notation similar to Unified Modelling Language (UML) Activity Diagrams. The COM module 22 and the MON module 23 receive Receiving Data (R-data). The COM module 22 handles the R-data and transmits it towards the output in form of T-data. The MON module 23 is configured to receive the same R-data as the COM module 22, to create a R-data sub-tuple of this R-data, and to store, for integrity checking, this R-data data sub-tuple in its memory. The MON module 23 is also configured to receive transmission data (T-data), which T-data are R-data forwarded by the COM module 22 (T-data which are originating from specific R-data are denoted as "corresponding" to said R-data), from the COM module 22 and to form a sub-tuple from said T-data (T-data sub-tuple) for comparison with the corresponding R-data data sub-tuple.

As described, the MON module 23 is configured to compare the R-data sub-tuple with the corresponding T-data sub-tuple. (The "corresponding T-data sub-tuple" is a sub-tuple formed of T-data, which T-data correspond to the R-data which are the basis for the R-data sub-tuple). Since the COM module 22 requires some amount of time to handle the R-data, and forward said R-data as T-data, the MON module 23 must store the R-data it will compare, that is the R-data sub-tuple, in its memory. In the case that said comparison of the R-data sub-tuple with the T-data sub-tuple delivers identical sub-tuples, the MON module 23 signals the on-off data switch 24 to forward the T-data (or to let them pass; or in case that the switch 24 normally is in a state that data may pass, no signal is provided to the switch 24).

The T-data and the T-data sub-tuple derived form said T-data are not stored, but may be buffered.

In case that the comparison of the R-data sub-tuple and the T-data sub-tuple delivers non-identical sub-tuples, the MON module 23 executes at least one action, for example signalling to the on-off data switch 24 to drop the T-data and to stop the transmission of said T-data, or to report an error, etc.

That which is claimed is:

1. A network device for a computer network, wherein said network device comprises:
    a communication module, wherein said communication module is connected to one or more input ports of the network device, wherein said communication module is connected to one or more output ports of the network device, and wherein the communication module is configured to receive data from the one or more input ports of the network device and transmit said data towards the one or more output ports of the network device; and
    a monitoring module, wherein said monitoring module is configured to receive the data, which is received by the communication module from the one or more input ports of the network device,
    wherein said communication module and said monitoring module are interconnected over at least one outgoing data communication link so that the monitoring module receives the data which the communication module transmits towards the one or more output ports, wherein the communication module receives R-data comprising n data elements, wherein said n data elements form an n-tuple, wherein said R-data is data which the communication module receives from the one or more input ports, wherein all n data elements of the R-data are designated to be transmitted by the communication module towards one selected output port of the one or more output ports or towards more than one selected output ports of the one or more output ports, wherein the monitoring module receives the R-data, wherein the communication module transmits T-data comprising data based on the n data elements of the R-data received by the communication module towards the one or more output ports of the network device for which the R-data corresponding to the T-data are designated, and wherein the monitoring module is configured to receive said T-data, and
    wherein the monitoring module is configured to:
        derive, after receiving the R-data also received by the communication module, a sub-tuple of said R-data comprising an R-data sub-tuple, wherein said R-data sub-tuple comprises m of the n data elements of the n-tuple of R-data, wherein $m>0$ and $m<n$,
        store, after determining said R-data sub-tuple, only said R-data sub-tuple,
        derive, after receiving the T-data corresponding to said R-data, a sub-tuple of said T-data comprising T-data sub-tuple,
        compare said R-data sub-tuple with said T-data sub-tuple, and
        execute at least one specified or specifiable action, if the comparison of said R-data sub-tuple with said T-data sub-tuple results in said R-data sub-tuple and said T-data sub-tuple not being identical,
    wherein the monitoring module is additionally configured to calculate and to store a first checksum comprising an R-data checksum, wherein the R-data checksum is calculated
        using the R-data received,
        using the R-data sub-tuple,
        using a second sub-tuple of the R-data received and a second calculated checksum comprising a T-data checksum,
        using a T-data subset corresponding to said R-data,
        using the T-data sub-tuple of the T-data corresponding to said R-data, or
        using a second T-data sub-tuple corresponding to said R-data, wherein for determining a second R-data sub-tuple and said second T-data sub-tuple from the R-data and the corresponding T-data, the same rule or scheme is applied, and
        comparing said R-data checksum with said T-data checksum, wherein the monitoring module is configured to execute the at least one specified or specifiable action, if the comparison of said R-data checksum with said T-data checksum yields that the R-data and T-data checksums are not identical, and
    wherein said at least one specified or specifiable action comprises:
        reporting an error to an error-handling hardware or software module; and/or
        controlling an on-off data switch and stopping said on-off data switch from forwarding the T-data of said communication module to the one or more outputs of the network device.

2. The network device according to claim 1, wherein the communication module is connected to each of the one or more input ports with at least one incoming connection link and to each of the one or more output ports with the at least one outgoing connection link, wherein the at least one incoming and outgoing connection links are bi-directional connection links.

3. The network device according to claim 1, wherein for each input port of the one or more input ports, at least one branch connection link is provided, which is connected to the monitoring module, and wherein:
said at least one branch connection link is further connected to said one or more input ports, or
the at least one branch connection link is additionally connected to at least one incoming connection link which connects said one or more input ports with the communication module.

4. The network device according to claim 1, wherein the monitoring module applies, for determining the R-data sub-tuple, an identical rule or scheme as for determining the T-data sub-tuple of the T-data corresponding to said R-data.

5. The network device according to claim 1, wherein the at least one specified or specifiable action comprises one or more of the following actions:
reporting an error to an error-handling hardware or software module;
controlling, over a control interface, one or more on-off data switches, which at least one on-off data switch being capable of stopping data to be forwarded to the one or more output ports of the network device, wherein the at least one on-off data switch is arranged between the communication module and the one or more output ports of the network device, and wherein said at least one on-off data switch is configured to stop forwarding said T-data of the communication module to the one or more output ports of the network device or to bring the at least one on-off data switch into a state in which said T-data cannot pass the at least one on-off data switch.

6. The network device according to claim 1, wherein the data is received and transmitted according to an Ethernet protocol, wherein the n data elements being comprised in said data are encapsulated into Ethernet frames, and wherein the monitoring module is configured to compare the R-data sub-tuple of R-data being encapsulated into the Ethernet frame with the corresponding T-data sub-tuple of the corresponding T-data being encapsulated into the Ethernet frame.

7. The network device according to claim 6, wherein the R-data sub-tuple and/or the T-data sub-tuple is one or a combination of the following items:
an Ethernet header of the Ethernet frame or a part or parts of the Ethernet header of the Ethernet frame;
a sequence number of the Ethernet frame;
a payload or parts of the payload of the Ethernet frame; and/or
a frame check sequence ("FCS") of the Ethernet frame, except when the Ethernet frame comprises an FCS, wherein in such instances the combination of the Ethernet header, sequence number, payload, and FCS are excluded, and
except when the Ethernet frame does not comprise an FCS, wherein in such instances the combination of the Ethernet header, sequence number, and payload are excluded.

8. The network device according to claim 1, wherein the communication module and the monitoring module are implemented in hardware or in software.

9. The network device according to claim 1, wherein the communication module and the monitoring module are implemented in different chips or in a single chip.

10. The network device according to claim 1, wherein one or more data elements of the R-data represent a frame check sequence comprising R-data FCS, wherein the monitoring module is configured to calculate a frame check sequence comprising a monitoring FCS of data elements being contained in the T-data corresponding to said R-data, and to compare the calculated R-data FCS with said monitoring FCS, wherein the monitoring module is configured to execute the at least one specified or specifiable action, if the comparison of said monitoring FCS with said R-data FCS yields checksums, which are not identical, and wherein said at least one specified or specifiable action is one or more of the following actions:
reporting an error to an error-handling hardware or software module; and
controlling an on-off data switch and stopping said on-off data switch from forwarding said transmission data of said communication module to the one or more outputs of the network device.

11. The network device according to claim 1, wherein the communication module executes data transmission according to a specified and/or specifiable communication schedule comprising a time-triggered communication schedule, wherein the monitoring module comprises knowledge of said specified and/or specifiable communication schedule, wherein the monitoring module checks if T-data of the communication module occur corresponding to said specified and/or specifiable communication schedule, wherein the monitoring module is configured to execute the at least one specified or specifiable action, if T-data of the communication module does not occur corresponding to said specified and/or specifiable communication schedule, and wherein said at least one specified or specifiable action is one or more of the following actions:
reporting an error to an error-handling hardware or software module; and
controlling an on-off data switch and stopping said on-off data switch from forwarding said T-data of the communication module to the one or more outputs of the network device.

12. The network device according to claim 1, wherein the network device is an Ethernet switch, and/or wherein the communication between the communication module and the monitoring module takes place over a Media-independent interface ("MII"), a Gigabit media-independent interface ("GMI"), or a reduced media-independent interface.

13. A computer network comprising:
a plurality of network devices; and
a plurality of communication channels, wherein each communication channel connects at least two network devices of the plurality of network devices to allow communication between connected network devices, including an exchange of messages according to a network protocol,
wherein the plurality of network devices of the computer network comprise the network device according to claim 1.

14. A method for data integrity check in a network device of a computer network, wherein said network device comprises:
a communication module, wherein said communication module is connected to one or more input ports of the network device, wherein said communication module is connected to one or more output ports of the network device, wherein the communication module is configured to receive data from the one or more input ports of the network device and transmit said data towards the one or more output ports of the network device, and a monitoring module, wherein said monitoring module is configured to receive the data, which is received by the communication module from the one or more input ports of the network device, wherein said communication module and said monitoring module are interconnected over at least one outgoing data communication link so that the monitoring module receives the data which the communication module transmits towards the one or more output ports, wherein the communication module receives R-data, wherein R-data comprise n data elements, wherein said n data elements form an n-tuple, wherein said R-data is data which the communication module receives from the one or more input ports, wherein all n data elements of the R-data are designated to be transmitted by the communication module towards one selected output port of the one or more output ports or towards more than one selected output ports of the one or more output ports, wherein the monitoring module receives the R-data, wherein the communication module transmits T-data comprising data based on the n data elements of the R-data received by the communication module towards the one or more output ports of the network device, for which the R-data corresponding to the T-data are designated, and wherein the monitoring module receives said T-data, the method comprising:

determining, by the monitoring module, after receiving the R-data, a sub-tuple of said R-data comprising R-data sub-tuple, wherein said R-data sub-tuple comprises m of the n data elements of the n-tuple of R-data, wherein m>0 and m<n, storing, via the monitoring module, after determining said R-data sub-tuple, only said R-data sub-tuple, determining, via the monitoring module, after receiving the T-data corresponding to said R-data, a sub-tuple of said T-data comprising T-data sub-tuple, comparing, via the monitoring module, said stored R-data sub-tuple with said T-data sub-tuple, and executing, via the monitoring module, at least one specified or specifiable action, if the comparison of said stored R-data sub-tuple with said T-data sub-tuple results in said R-data sub-tuple and said T-data sub-tuple not being identical, wherein the monitoring module additionally calculates and stores a first checksum comprising an R-data checksum, wherein the R-data checksum is calculated using the R-data received,
using the R-data sub-tuple,
using a second sub-tuple of the R-data received and a second calculated checksum comprising a T-data checksum,
using a T-data subset corresponding to said R-data,
using the T-data sub-tuple of the T-data corresponding to said R-data, or
using a second T-data sub-tuple corresponding to said R-data, wherein for determining a second R-data sub-tuple and said second T-data sub-tuple from the R-data and the corresponding T-data, the same rule or scheme is applied, and
comparing said R-data checksum with said T-data checksum, wherein the monitoring module is configured to execute the at least one specified or specifiable action, if the comparison of said R-data checksum with said T-data checksum yields that the R-data and T-data checksums are not identical, and wherein said at least one specified or specifiable action is one or more of the following actions:

reporting an error to an error-handling hardware or software module; and controlling an on-off data switch and stopping said on-off data switch from forwarding the T-data of said communication module to the one or more output ports of the network device.

15. The method according to claim 14, wherein the monitoring module applies, for determining the R-data sub-tuple, an identical rule or scheme for determining the T-data sub-tuple of the T-data corresponding to said R-data.

16. The method according to claim 14, wherein the at least one specified or specifiable action is one or more of the following actions:

reporting an error to an error-handling hardware or software module; and controlling, over a control interface, one or more on-off data switches, which at least one on-off data switch is capable of stopping data to be forwarded to the one or more output ports of the network device, wherein the at least one on-off data switch is arranged between the communication module and the one our more output ports of the network device, and wherein the at least one on-off data switch is configured to stop forwarding said T-data of the communication module to the one or more output ports of the network device or bring the at least one on-off data switch into a state in which said T-data cannot pass the at least one on-off data switch.

17. The method according to claim 14, wherein data is received and transmitted according to an Ethernet protocol, wherein the n data elements comprised in said data are encapsulated into Ethernet frames, wherein the monitoring module is configured to compare the R-data sub-tuple of R-data being encapsulated into the Ethernet frame with the corresponding T-data sub-tuple of the corresponding T-data being encapsulated into the Ethernet frame.

18. The method according to claim 17, wherein the R-data sub-tuple and/or the T-data sub-tuple is one or a combination of the following items:

an Ethernet header of the Ethernet frame or a part or parts of the Ethernet header of the Ethernet frame;

a sequence number of the Ethernet frame;

a payload or parts of the payload of the Ethernet frame; and/or a frame check sequence ("FCS") of an Ethernet frame, except when the Ethernet frame comprises an FCS, wherein in such instances the combination of the Ethernet header, sequence number, payload, and FCS are excluded, and except when the Ethernet frame does not comprise an FCS, wherein in such instances the combination of the Ethernet header, sequence number, and payload are excluded.

19. The method according to claim 14, wherein one or more data elements of the R-data represent a frame check sequence comprising an R-data FCS, wherein the monitoring module calculates a frame check sequence comprising a monitoring FCS of data elements being contained in the T-data corresponding to said R-data, and compares the calculated R-data FCS with said monitoring FCS, wherein the monitoring module executes the at least one specified or specifiable action, if the comparison of said monitoring FCS with said R-data FCS yields checksums, which are not identical, and wherein said at least one specified or specifiable action is one or more of the following actions:
- reporting an error to an error-handling hardware or software module; and
- controlling an on-off data switch and stopping said on-off data switch from forwarding said transmission data of said communication module to the one or more output ports of the network device.

20. The method according to claim 14, wherein the communication module executes data transmission according to a specified and/or specifiable communication schedule comprising a time-triggered communication schedule, wherein the monitoring module has knowledge of said specified and/or specifiable communication schedule, wherein the monitoring module checks if T-data of the communication module occur corresponding to said specified and/or specifiable communication schedule, wherein the monitoring module is configured to execute the at least one specified or specifiable action, if T-data of the communication module does not occur corresponding to said specified and/or specifiable communication schedule, and wherein said at least one specified or specifiable action is one or more of the following actions:
- reporting an error to an error-handling hardware or software module; and
- controlling an on-off data switch and stopping said on-off data switch from forwarding said T-data of the communication module to the one or more output ports of the network device.

21. The method according to claim 14, wherein the network device is an Ethernet switch, and/or wherein the communication between the communication module and the monitoring module takes place over a Media-independent interface ("MII"), a Gigabit media-independent interface ("GMII"), or a reduced media-independent interface ("RMII").

* * * * *